(12) United States Patent
Ueta

(10) Patent No.: US 11,119,428 B2
(45) Date of Patent: Sep. 14, 2021

(54) IMAGE ROTATION IN IMAGE FORMING APPARATUS BASED ON DETERMINATION OF POWER CONSUMPTION BY HEATER ELEMENTS

(71) Applicant: TOSHIBA TEC KABUSHIKI KAISHA, Tokyo (JP)

(72) Inventor: Tsutomu Ueta, Yaizu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/793,787

(22) Filed: Feb. 18, 2020

(65) Prior Publication Data

US 2021/0255571 A1    Aug. 19, 2021

(51) Int. Cl.
*G03G 15/20*    (2006.01)
*G03G 15/36*    (2006.01)
*G06F 3/12*    (2006.01)

(52) U.S. Cl.
CPC ......... *G03G 15/36* (2013.01); *G03G 15/2039* (2013.01); *G06F 3/1242* (2013.01)

(58) Field of Classification Search
CPC ... G03G 15/36; G03G 15/2039; G06F 3/1242

USPC .................................. 358/1.9, 1.18; 399/67
See application file for complete search history.

(56) References Cited

FOREIGN PATENT DOCUMENTS

JP    2016-071139 A     5/2016
JP       6409461 B2  * 10/2018

* cited by examiner

*Primary Examiner* — Jamares Q Washington
(74) *Attorney, Agent, or Firm* — Kim & Stewart LLP

(57) ABSTRACT

An image forming apparatus includes an image forming device, a heater, and a control circuit. The control circuit is configured to generate first energization data based on at least part of first raster image data representing a first image to be formed on a first page, and then compress the first raster image data into first compressed image data. The control circuit is also configured to generate second energization data based on at least part of second raster image data representing a second image to be formed on a second page, and then compress the second raster image data into second compressed image data. The control circuit is configured to further determine whether rotation of the second image by a predetermined degree will lower power consumption based on a comparison of the first energization data to the second energization data.

14 Claims, 9 Drawing Sheets

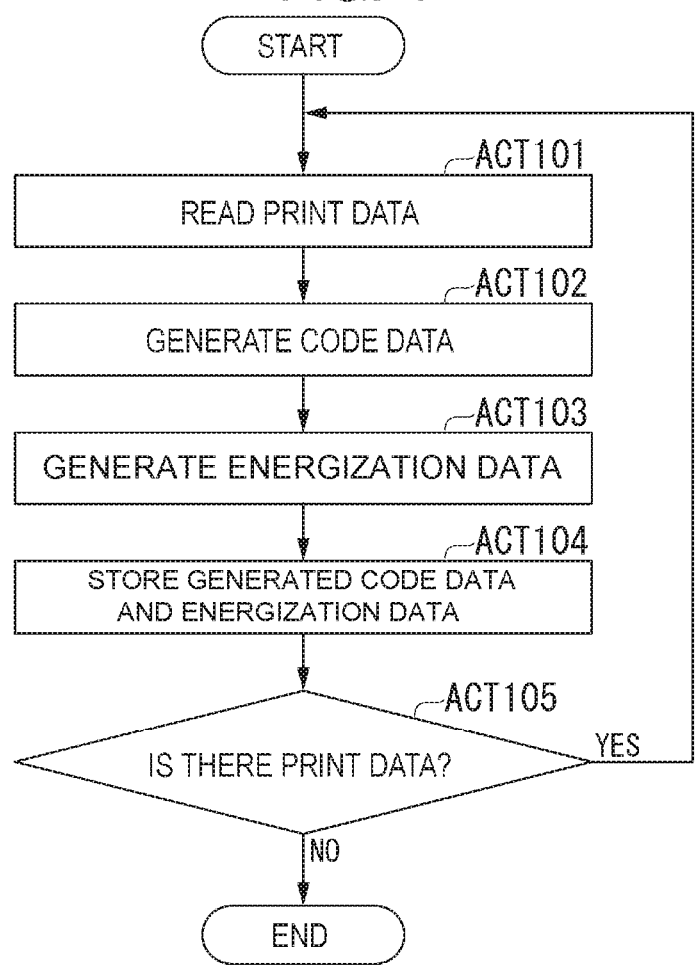

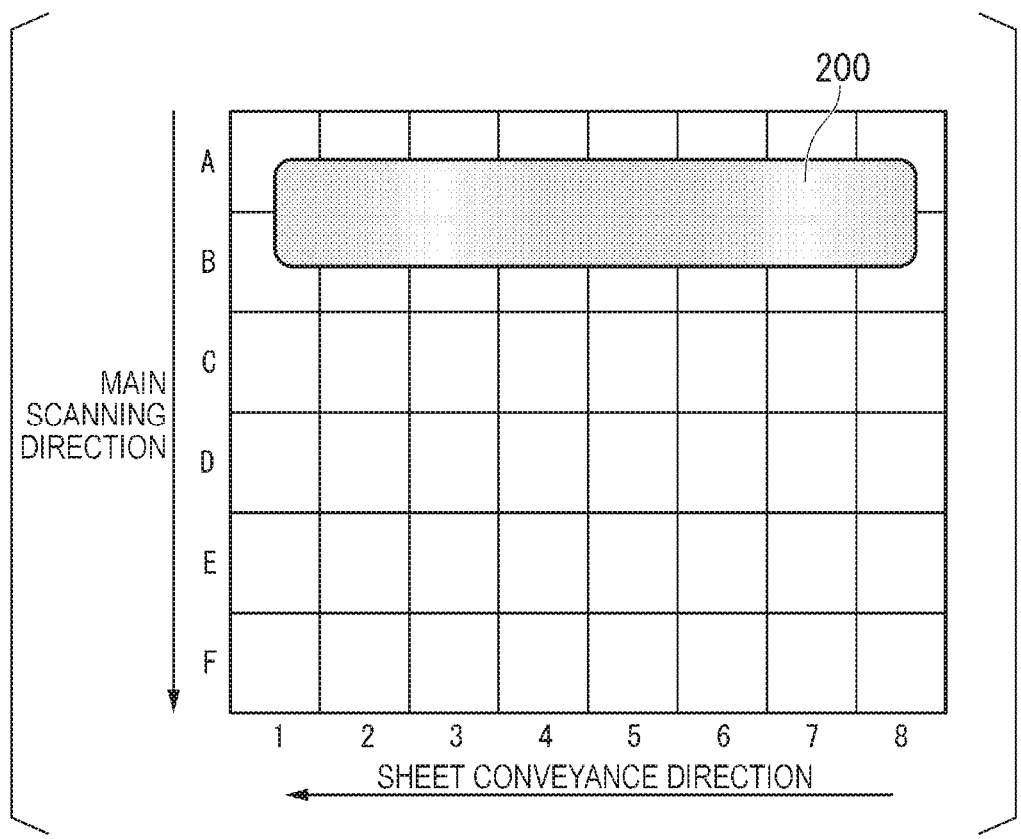

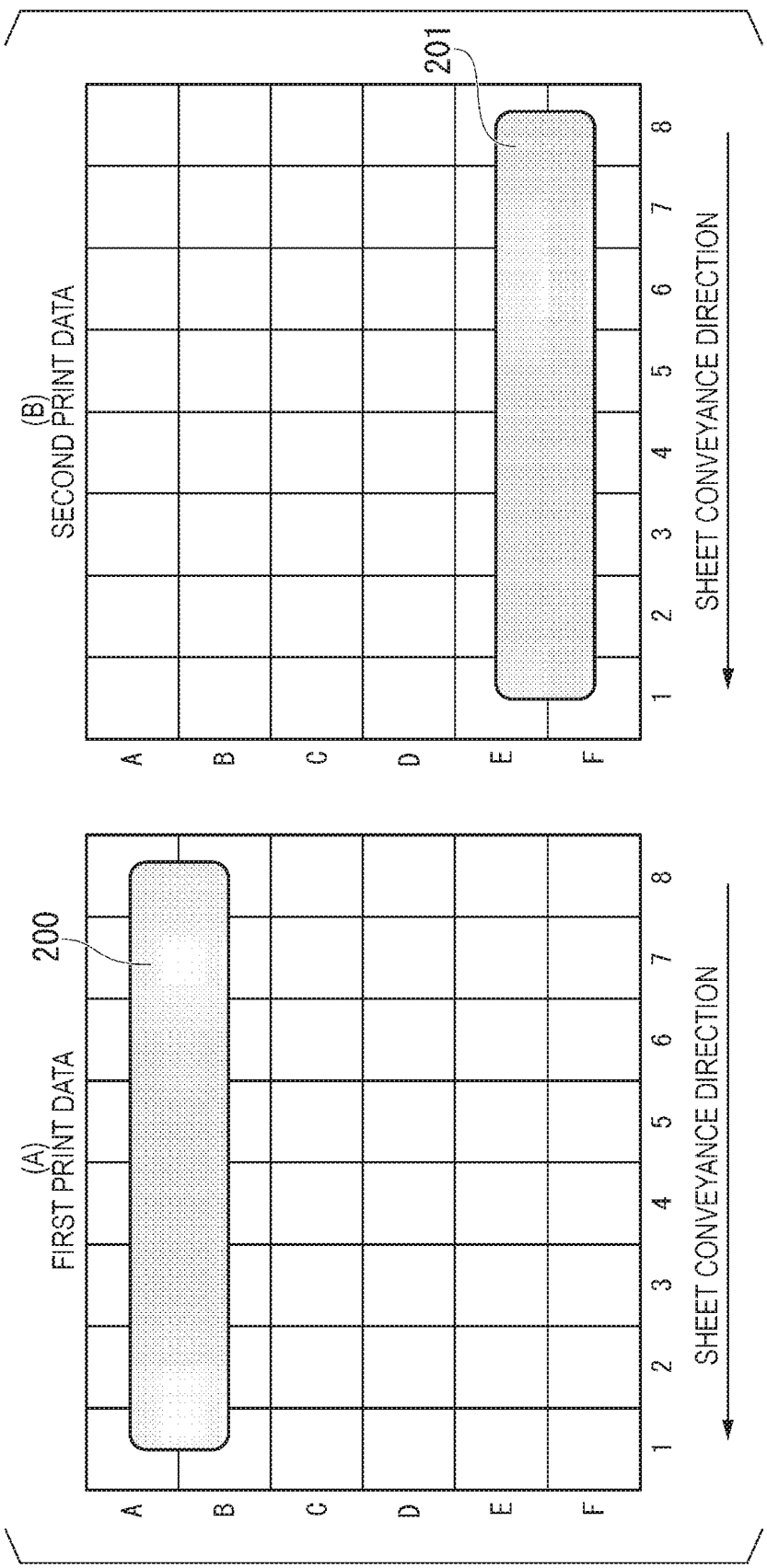

FIG. 8

(A)
ENERGIZATION DATA OF FRONT PORTION IN FIRST PRINT DATA

| F | E | D | C | B | A |
|---|---|---|---|---|---|
| 0 | 0 | 0 | 0 | 1 | 1 |

ENERGIZATION DATA OF REAR PORTION IN FIRST PRINT DATA

| F | E | D | C | B | A |
|---|---|---|---|---|---|
| 0 | 0 | 0 | 0 | 1 | 1 |

(B)
ENERGIZATION DATA OF FRONT PORTION IN SECOND PRINT DATA (ROTATED BY 0°)

| F | E | D | C | B | A |
|---|---|---|---|---|---|
| 1 | 1 | 0 | 0 | 0 | 0 |

ENERGIZATION DATA OF REAR PORTION IN SECOND PRINT DATA (ROTATED BY 0°)

| F | E | D | C | B | A |
|---|---|---|---|---|---|
| 1 | 1 | 0 | 0 | 0 | 0 |

FIG. 9

ENERGIZATION DATA OF FRONT PORTION IN SECOND PRINT DATA (ROTATED BY 180°)

| F | E | D | C | B | A |
|---|---|---|---|---|---|
| 0 | 0 | 0 | 0 | 1 | 1 |

ENERGIZATION DATA OF REAR PORTION IN SECOND PRINT DATA (ROTATED BY 180°)

| F | E | D | C | B | A |
|---|---|---|---|---|---|
| 0 | 0 | 0 | 0 | 1 | 1 |

FIG. 12

|  | F | E | D | C | B | A |
|---|---|---|---|---|---|---|
| ENERGIZATION DATA OF REAR PORTION IN FIRST PRINT DATA | 0 | 0 | 0 | 0 | 1 | 1 |
|  | & | & | & | & | & | & |
| ENERGIZATION DATA OF FRONT PORTION IN SECOND PRINT DATA (ROTATED BY 0°) | 1 | 1 | 0 | 0 | 0 | 0 |
|  | = | = | = | = | = | = |
| OPERATION RESULT | 0 | 0 | 0 | 0 | 0 | 0 |

FIG. 13

|  | F | E | D | C | B | A |
|---|---|---|---|---|---|---|
| ENERGIZATION DATA OF REAR PORTION IN FIRST PRINT DATA | 0 | 0 | 0 | 0 | 1 | 1 |
|  | & | & | & | & | & | & |
| ENERGIZATION DATA OF FRONT PORTION IN SECOND PRINT DATA (ROTATED BY 180°) | 0 | 0 | 0 | 0 | 1 | 1 |
|  | = | = | = | = | = | = |
| OPERATION RESULT | 0 | 0 | 0 | 0 | 1 | 1 |

IMAGE ROTATION IN IMAGE FORMING APPARATUS BASED ON DETERMINATION OF POWER CONSUMPTION BY HEATER ELEMENTS

FIELD

Embodiments described herein relate generally to an image forming apparatus and an image forming method.

BACKGROUND

In the related art, there is an image forming apparatus including a fixing device that includes a plurality of heater elements arranged along a main scanning direction. In such an image forming apparatus, printing is performed by independently energizing the heater elements to selectively heat predetermined heating regions corresponding to different an image sub-portions. In such a fixing device, since energization of the plurality of heater elements can be controlled independently, it is not necessary to supply power to the heater elements that do not need to be energized if, for example, the sheet being printed does not overlap particular heating elements. For that reason, power consumption can be reduced. In some fixing devices, the amount of power expected to be consumed for printing print data at one orientation can be compared to the amount of power expected to be consumed for printing the print data a different orientation and the printing of the print data can be performed at the orientation having the lower power consumption.

However, in general, the image forming apparatus in the related art must at least temporarily compresses the print data and store the compressed print data in a storage device for various analyses of expected power consumption. Therefore, when actually printing, it may take additional time to print because the image forming apparatus calculates expected power consumption only after decompressing the print data before printing, then determines whether image rotation is desirable, and then performs the image rotation processing.

DESCRIPTION OF THE DRAWINGS

FIG. 4 is a flowchart of energization data generation processing.

FIG. 5 is a diagram illustrating a method of generating energization data.

FIG. 6 is a diagram illustrating an example of energization data generated based on print data illustrated in FIG. 5.

FIG. 7 is a diagram illustrating processing when there are print data for multiple pages.

FIG. 8 is a diagram illustrating an example of energization data of the print data in the example of FIG. 7.

FIG. 9 is a diagram illustrating an example of energization data of the print data in the example of FIG. 7 after image rotation.

FIG. 12 is a diagram illustrating a result of a logical operation when an image corresponding to the second print data is rotated by 0°.

FIG. 13 is a diagram illustrating a result of the logical operation when an image corresponding to the second print data is rotated by 180°.

DETAILED DESCRIPTION

An image forming apparatus according to an embodiment includes an image forming device, a heater, and a control circuit. The image forming device configured to form images (e.g., toner images) on sheets. The heater includes a plurality of heater elements arranged in a first direction corresponding, for example, to the sheet-width direction. The heater is configured to fix images to the sheets conveyed from the image forming device. The control circuit is configured to generate first energization data indicating energization states of each of the heater elements based on first raster image data representing a first image to be formed by the image forming device, then compress the first raster image data into first compressed image data, and store the generated first energization data and the first compressed image data in a storage. The control circuit is also configured to generate second energization data indicating energization states of each of the heater elements based on second raster image data representing a second image to be formed by the image forming device after the first image, then compress the second raster image data into second compressed image data, and store the generated second energization data and the second compressed image data in the storage. The control circuit determines whether rotation of the second image by a predetermined degree will lower power consumption in the printing of the first and second images. The determination is based on a comparison of the first energization data to the second energization data.

Figure 1:
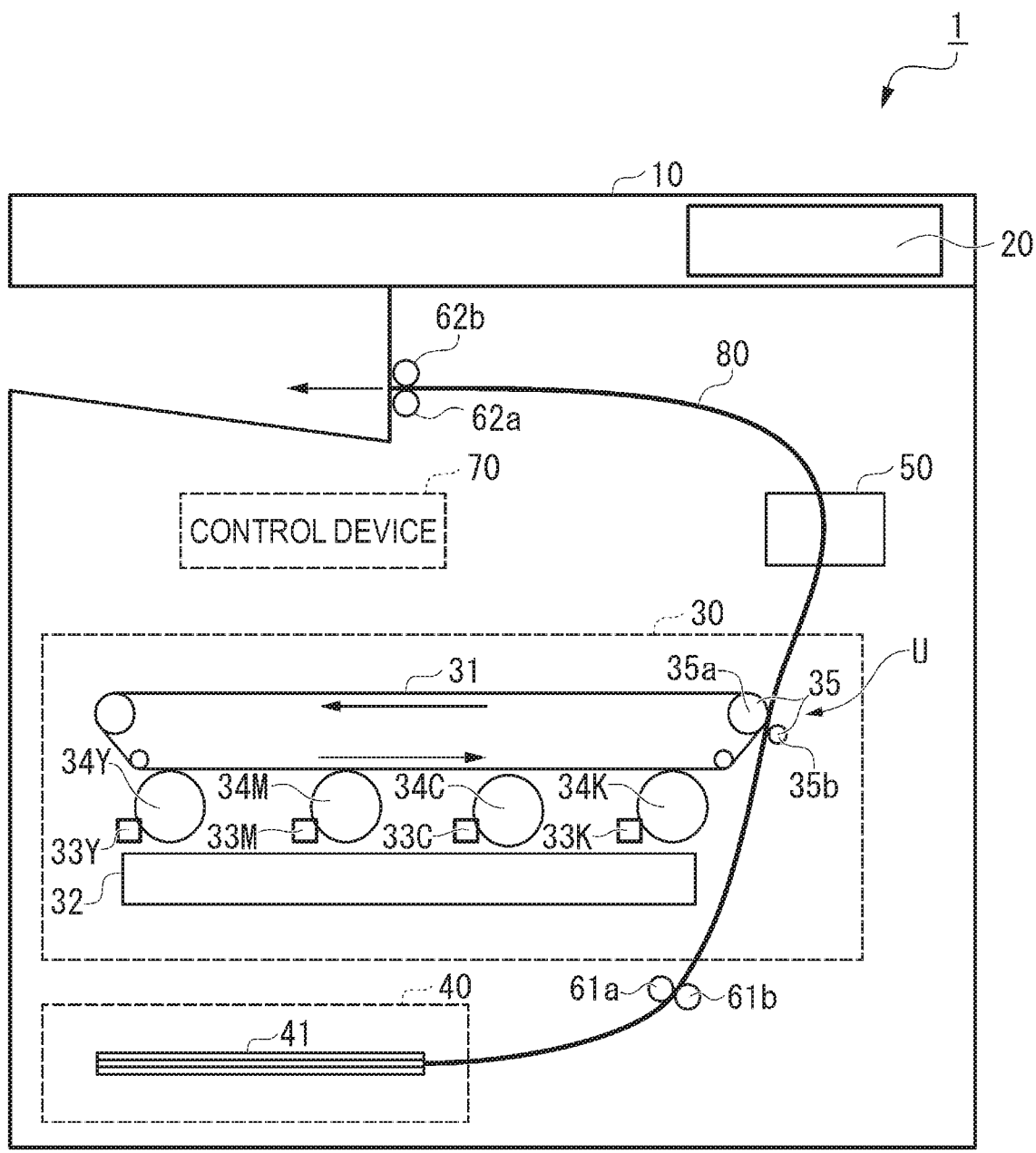
FIG. 1 is a diagram illustrating an example of an overall configuration of an image forming apparatus according to an embodiment.

FIG. 1 is a diagram illustrating an example of the overall configuration of an image forming apparatus 1 according to an embodiment. The image forming apparatus 1 according to the embodiment is a multi-function peripheral (MFP). The image forming apparatus 1 executes printing by an image forming processing and an image fixing processing. The image forming processing forms an image (e.g., a toner image) on a sheet. The image fixing processing fixes the image on the sheet. The sheet is, for example, paper on which text, characters, or images can be formed. In general, the sheet may be any material as long as the image forming apparatus 1 can form an image thereon.

The image forming apparatus 1 includes an image reading unit 10, a control panel 20, an image forming unit 30, a sheet storage unit 40, a fixing device 50, conveyance rollers 61a and 61b, paper discharge rollers 62a and 62b, and a control device 70.

The image reading unit 10 reads an image on a document according to reflected light contrast or the like. For example, the image reading unit 10 reads an image from a reading target sheet set on a document reading platen and generates image data. The image reading unit 10 records (stores) the generated image data. The recorded image data may be transmitted to an information processing apparatus via a network. The recorded image data may be processed for forming a corresponding image on the sheet by the image forming unit 30 as print data.

The control panel 20 includes a display unit and an operation unit. The display unit is a display device such as a liquid crystal display and an organic electro luminescence (EL) display. The display unit displays various information related to the image forming apparatus 1 in accordance with the control of the control device 70. The operation unit includes a plurality of buttons or the like. The operation unit receives a user input operation. For example, the operation unit receives a print execution instruction. The operation unit outputs a signal corresponding to the input operation performed by the user to the control device 70. The display unit and the operation unit may be configured as an integrated touch panel.

The image forming unit 30 executes image forming processing. Specifically, the image forming unit 30 forms an image on the sheet based on the image data generated by the image reading unit 10 or image data received via a communication path. For example, the image forming unit 30 forms a toner image on the sheet with toner.

The image forming unit 30 includes a transfer belt 31, an exposure unit 32, developing devices s 33Y, 33M, 33C, and 33K, photoconductive drums 34Y, 34M, 34C, and 34K, and a transfer unit 35.

The transfer belt 31 is an endless intermediate transfer member. The transfer belt 31 rotates in the direction indicated by the arrow (counterclockwise in the figure) by rotation of the roller(s).

The exposure unit 32 is provided at a position facing the photoconductive drums 34Y, 34M, 34C, and 34K between the developing devices 33Y, 33M, 33C, and 33K and a respective charger (not separately illustrated). The exposure unit 32 irradiates the surface (photoconductive layer) of each of the photosensitive drums 34Y, 34M, 34C, and 34K with laser light based on the image data. The direction along which a photoconductive drum is scanned with the laser light is called the main scanning direction, and the direction orthogonal to the main scanning direction is called the sub-scanning direction. For example, in the present embodiment, the main scanning direction coincides with the axial direction of the photoconductive drum, and the sub-scanning direction coincides with the rotation direction of the transfer belt.

Charges stored on the surface (photoconductive layer) of each of the photoconductive drums 34Y, 34M, 34C, and 34K disappear due to the irradiation of the laser light. As a result, an electrostatic pattern is formed on the surface of each of the photoconductive drums 34Y, 34M, 34C, and 34K at the positions irradiated with the laser light. In other words, electrostatic latent images are formed on the surfaces of the photoconductive drums 34Y, 34M, 34C, and 34K by irradiation of the laser light from the exposure unit 32. The exposure unit 32 may use light emitting diode (LED) light instead of laser light in some examples. The exposure unit 32 is controlled to emit light based on the image data under the control of the control device 70.

The developing devices 33Y, 33M, 33C, and 33K supply toners to the photoconductive drums 34Y, 34M, 34C, and 34K. For example, the developing device 33Y develops the electrostatic latent image on the surface of the photoconductive drum 34Y with a yellow (Y) toner. The developing device 33M develops the electrostatic latent image on the surface of the photoconductive drum 34M with a magenta (M) toner. The developing device 33C develops the electrostatic latent image on the surface of the photoconductive drum 34C with a cyan (C) toner. The developing device 33K develops the electrostatic latent image on the surface of the photoconductive drum 34K with a black (K) toner.

The developing devices 33Y, 33M, 33C, and 33K form toner images as visible images on the photoconductive drums 34Y, 34M, 34C, and 34K. The toner images formed on the photoconductive drums 34Y, 34M, 34C, and 34K are transferred (primary transfer) onto the transfer belt 31 by a plurality of primary transfer rollers. The plurality of primary transfer rollers are provided at positions facing the photoconductive drums 34Y, 34M, 34C, and 34K with the transfer belt 31 interposed therebetween.

The transfer unit 35 includes a support roller 35a and a secondary transfer roller 35b. The transfer unit 35 transfers the toner image on the transfer belt 31 to a sheet 41 at a secondary transfer position U. The secondary transfer position U is a position where the support roller 35a and the secondary transfer roller 35b face each other with the transfer belt 31 interposed therebetween. The transfer unit 35 applies a transfer bias controlled by a transfer current to the transfer belt 31. The transfer unit 35 transfers the toner image on the transfer belt 31 to the sheet 41 by the transfer bias. The transfer current is controlled by the control device 70.

The sheet storage unit 40 includes one or more paper feed cassettes. The sheet feed cassette stores sheets 41 of a predetermined size and a predetermined type. The paper feed cassette includes a pickup roller. The pickup roller picks up the sheets 41 one by one from the paper feed cassette. The pickup roller supplies the picked-up sheet 41 to a conveyance unit 80.

The fixing device 50 executes image fixing processing. Specifically, the fixing device 50 fixes an image (for example, a toner image) formed on the sheet 41 by heating and pressing the sheet 41. The fixing device 50 according to the present embodiment includes a heating unit having a plurality of heat generating elements that are arranged in the main scanning direction and can be controlled to be heated independently for each predetermined heating region. Each of the heater elements generates heat when energized. That is, the energized heater element generates heat, and the non-energized heater element does not generate heat. The heater element applies heat to the sheet 41. A press roller is installed at a position facing the heating unit. The press roller presses the sheet 41 against the heating unit.

The transport rollers 61a and 61b supply the sheet 41 fed from the paper feed cassette to the image forming unit 30. The transport rollers 61a and 61b are installed at opposing positions.

The paper discharge rollers 62a and 62b discharge the sheet 41 after the fixing device 50 to the discharge unit. The paper discharge rollers 62a and 62b are installed at opposing positions.

The control device 70 controls each functional unit of the image forming apparatus 1.

The conveyance unit 80 conveys the sheet 41. The conveyance unit 80 includes a conveyance path and a plurality of rollers. The conveyance path is a path through the image forming apparatus 1 along which the sheet 41 is conveyed. The roller(s) move/convey the sheet 41 by rotating according to the control of the control device 70.

Figure 2:
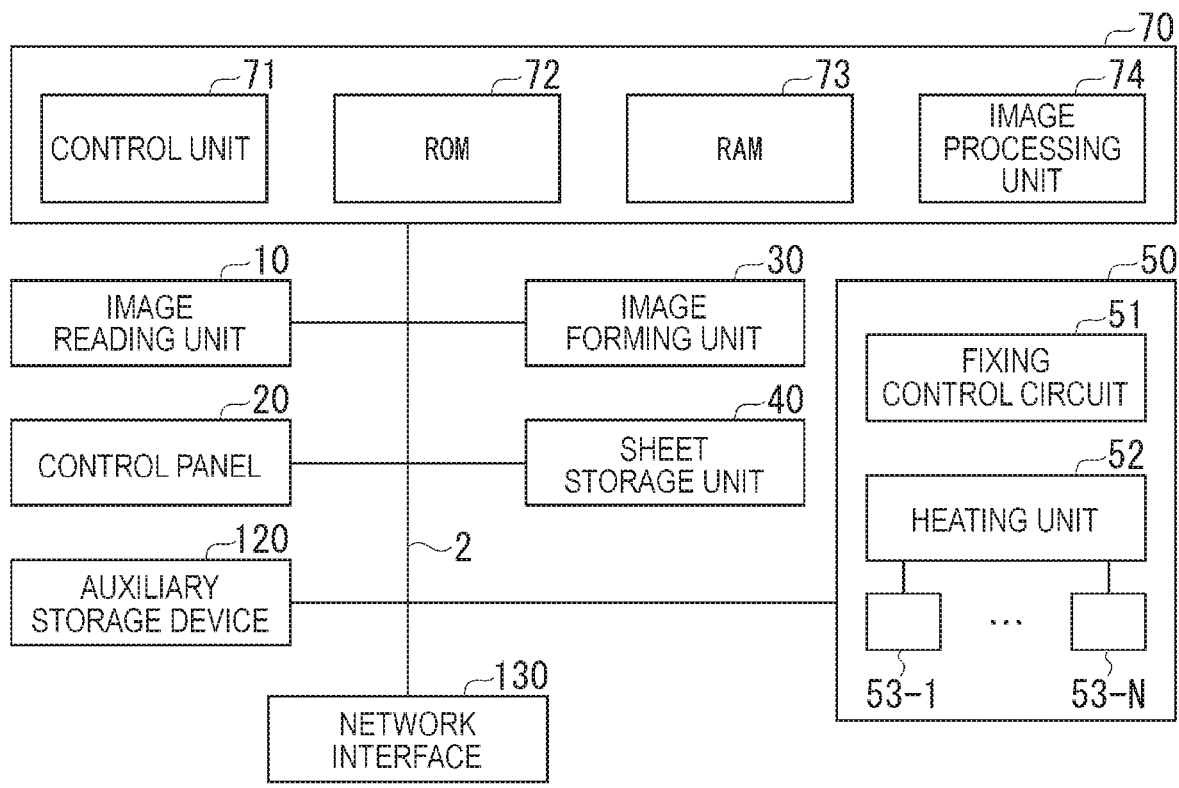
FIG. 2 is a block diagram illustrating a hardware configuration of an image forming apparatus according to an embodiment.

FIG. 2 is a block diagram illustrating a hardware configuration of the image forming apparatus 1 according to the embodiment. FIG. 2 illustrates only a schematic hardware configuration of the image forming apparatus 1 in the present embodiment.

The image forming apparatus 1 includes an image reading unit 10, a control panel 20, an image forming unit 30, a sheet storage unit 40, a fixing device 50, a control device 70, an auxiliary storage device 120, and a network interface 130. Each functional unit is connected via a system bus 2 so that data communication is possible.

The fixing device 50 includes a fixing control circuit 51, a heating unit 52, and a press roller (not separately illustrated).

The fixing control circuit 51 controls the heating of the heating unit 52 in response to an instruction from the control device 70. Specifically, the fixing control circuit 51 supplies power to a heater element that is a target for heating (hereinafter, referred to as "target heater element") in response to an instruction from the control device 70. On the other hand, the fixing control circuit 51 cuts off power supply to heater elements other than the target heater elements (hereinafter, referred to as "non-target heater elements"). For example, a power supply source and heater elements may be connected to each other via switches.

In this case, the fixing control circuit 51 turns on a switch connected to a target heater element so as to electrically connect the power supply source and the target heater element, thereby supplying power to the target heater element. As a result, the target heater element generates heat by, for example, resistive heating or the like. In addition, the fixing control circuit 51 turns off the switch connected to the non-target heater element so as to make the power supply source and the non-target heater element non-conductive, thereby cutting off the power supply to the non-target heater element. Thus, the non-target heater element does not generate heat.

The heating unit 52 heats the sheet. The heating unit 52 includes a plurality of heater elements 53-1 to 53-N (N is an integer of 2 or more) (see FIG. 2) in the main scanning direction. The heater elements 53-1 to 53-N are independently controlled by turning on or off a respective switch connected thereto. For example, the heating unit 52 is a heating source including a plurality of heater elements 53-1 to 53-N. Different identification information is given to each of the heater elements 53-1 to 53-N, and the heater elements 53-1 to 53-N can thus be individually distinguished. In the following description, the heater elements 53-1 to 53-N are described as the heater elements 53 when not distinguished from each other.

Figure 3:
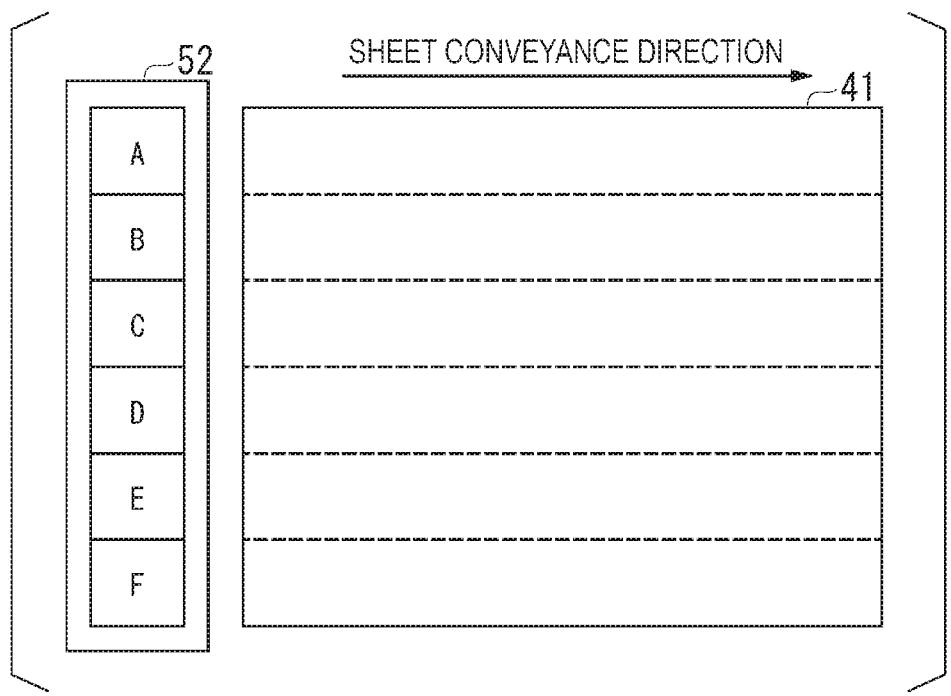
FIG. 3 is a diagram illustrating heating regions for a plurality of heater elements included in a heating unit.

FIG. 3 is a diagram illustrating a heating region of the plurality of heater elements 53-1 to 53-N included in the heating unit 52 in the present embodiment. In the present embodiment, the case where the heating unit 52 includes six heater elements (53-1 to 53-6) will be described as an example, but the number of heater elements 53 is not limited thereto. Each of the heater elements 53-1 to 53-6 heats a range corresponding to one of the depicted regions A to F. For example, the heater element 53-1 heats the range indicated by the region A. Similarly, the heater element 53-2 heats the range indicated by the region B. The heater element 53-3 heats the range indicated by the region C. The heater element 53-4 heats the range indicated by the region D. The heater element 53-5 heats the range indicated by the region E. The heater element 53-6 heats the range indicated by the region F.

The control device 70 includes a control unit 71, a read only memory (ROM) 72, a random access memory (RAM) 73, and an image processing unit 74. The control device 70 or a part thereof may be referred to as a control circuit. The control unit 71 is, for example, a processor such as a central processing unit (CPU) or a graphics processing unit (GPU). The control unit 71 controls the operation of each functional unit of the image forming apparatus 1. The control unit 71 executes various processing by loading the program stored in the ROM 72 in the RAM 73 to execute the program. An application specific integrated circuit (ASIC) may incorporated and used to provide certain functions realized by the control unit 71. The ASIC is an example of a dedicated circuit for realizing a specific function.

The ROM 72 stores a program for operating the control unit 71. The RAM 73 is a memory that temporarily stores data used by each functional unit included in the image forming apparatus 1. For example, the RAM 73 stores raster data obtained by converting print data, which is transmitted from an external device or generated by the image reading unit 10. The RAM 73 may store digital data generated by the image reading unit 10. The RAM 73 may temporarily store jobs and job logs.

The image processing unit 74 uses the print data as input data to perform image processing on the input data. The image processing unit 74 comprises an integrated circuit for image processing such as a field-programmable gate array (FPGA) or an application specific integrated circuit (ASIC). The print data processed by the image processing unit 74 is temporarily stored in the auxiliary storage device 120, then converted into raster data by the control unit 71 and loaded on the RAM 73.

The image processing unit 74 reads the raster data loaded on the RAM 73 and converts the raster data into encoded data (code data) for data storage. That is, the image processing unit 74 compresses raster data. In addition, the image processing unit 74 scans the raster data and determines a region where there is an image to be printed. Here, the determination on the region where the image to be printed is present is performed for each region obtained by dividing the print data into predetermined sections. The image processing unit 74 determines that there is an image in a region where the number of pixels of which value representing a color is greater than a certain numerical value in raster data is equal to or greater than a threshold. The pixel of which value presenting a color is greater than the certain numerical value may be referred to as a color pixel. On the other hand, the image processing unit 74 determines that there is no image in a region where the number of pixels greater than a certain numerical value representing a color in raster data is less than the threshold. According to this processing, the image processing unit 74 can discriminate between noise and an image (or image portion).

The image processing unit 74 generates energization data of the front portion and the rear portion of each heater element 53 in the sheet conveyance direction by using the determination result of each region. The front portion in the sheet conveyance direction represents a tip portion in the sheet conveyance direction when divided into the predetermined sections. The rear portion in the sheet conveyance direction represents a rear end portion in the sheet conveyance direction when divided into the predetermined sections. The energization data is information on the necessity of energization of each heater element 53. For example, the energization data includes information on the necessity of energization of the front portion and the rear portion of each heater element 53. For example, for each of the heater elements 53-1 to 53-6, a value of "1" is displayed when energization is necessary and "0" is displayed when no energization is necessary. The image processing unit 74 stores the generated code data (also referred to as encoded data) and energization data in association with each other in the auxiliary storage device 120. The image processing unit 74 may store the code data and the energization data in the RAM 73 in association with each other. The image processing unit 74 executes generation processing for code data and energization data by the number of pieces of print data.

The image processing unit 74 reads the code data and the energization data stored in the auxiliary storage device 120 when printing is executed. When there are a plurality of pieces of data to be printed, the image processing unit 74 reads all code data and energization data corresponding to all the data to be printed. In the following description, a case where there are two pieces of data to be printed will be described. Here, first print target data is defined as first print data, and second print target data is defined as second print data. In this case, the image processing unit 74 reads the code data and energization data corresponding to the first print data, and the code data and energization data corresponding to the second print data from the auxiliary storage device 120. The image processing unit 74 determines whether or not the code data corresponding to the second print data (hereinafter, referred to as "second code data") needs to be rotated based on the read energization data. When the image is rotated, the image processing unit 74 converts the second code data to third code data, which represents a third image obtained by rotating the second image, and decompresses the third code data. For example, when the image corresponding to second code data is rotated, the image processing unit 74 changes the arrangement of the second code data such that the image will be rotated by 180°.

On the other hand, when the image corresponding to the second code data is not rotated, so the image processing unit 74 does not change the arrangement of the second code data, (that is, there can be considered a rotation of the image by) 0° and decompresses the second code data.

The auxiliary storage device 120 is, for example, a hard disk or a solid state drive (SSD) and stores various data. The various data are, for example, digital data, print jobs, job logs, encoded data, and energization data.

The network interface 130 transmits and receives data to and from other devices. Here, the other device is an information processing device such as a personal computer. The network interface 130 operates as an input interface and receives print data or instructions transmitted from other devices. An instruction transmitted from the other device includes a print execution instruction. The network interface 130 operates as an output interface and transmits data to the other device.

FIG. 4 is a flowchart illustrating a flow of energization data generation processing performed by the image forming apparatus 1 in the present embodiment. It is assumed that the print data is converted into raster data and loaded on the RAM 73 at the start of the processing of FIG. 4.

The image processing unit 74 reads raster data from the RAM 73 (ACT 101). The image processing unit 74 converts the read raster data into code data (ACT 102). The image processing unit 74 generates energization data based on the read raster data (ACT 103).

FIG. 5 is a diagram illustrating aspects of a method of generating energization data in the present embodiment. In FIG. 5, the labelled regions "A" to "F" along the main scanning direction represent heating ranges of the heater elements 53-1 to 53-6. Further, the labelled regions "1" to "8" along the sheet conveyance direction (that is, the sub-scanning direction) correspond to ranges of the raster data divided at a predetermined interval along to the sheet conveyance direction. In this example, the range "1" is the front (leading) portion along the sheet conveyance direction, and the range of "8" is the rear (trailing) portion along the sheet conveyance direction. It is assumed in this example that there is an image 200 in the print data. Each depicted section formed by the divisions into ranges of "A" to "F" and the ranges of "1" to "8" is considered an image presence/absence determination region.

In the example of FIG. 5, there is an image along the sheet conveyance direction from the front portion (range "1") to the rear portion (range "8") for each of the ranges of "A" and "B" along the main scanning direction. Therefore, the heater element 53-1 corresponding to heating the "A" range and the heater element 53-2 corresponding to heating the "B" range are the target heater elements in this example. The image processing unit 74 determines that energization is necessary in the ranges of "A" and "B" from the front portion to the rear portion. Further, the image processing unit 74 determines that energization is not necessary in any of the ranges of "C" to "F" along the entire length (front to rear) along the sheet conveyance direction. As a result, the image processing unit 74 generates energization data like FIG. 6 based on the print data illustrated in FIG. 5.

FIG. 6 is a diagram illustrating an example of the energization data generated based on the print data illustrated in FIG. 5. The energization data illustrated in FIG. 6 includes a value "1" in columns for "A" and "B" in both the row for the front portion and the row for the rear portion. A value "0" in columns for "C" to "F" in both the row for the front portion and the row for the rear portion is in the illustrated energization data of FIG. 6.

Referring back to FIG. 4, the image processing unit 74 stores the generated code data and the energization data in association with each other in the auxiliary storage device 120 (ACT 104). Thereafter, the image processing unit 74 determines whether or not there is other print data (ACT 105). If there is other print data (ACT 105: YES), the image processing unit 74 reads the other print data and again executes the processing after ACT 101.

On the other hand, if there is no other print data (ACT 105: NO), the image processing unit 74 ends the processing of FIG. 4.

FIG. 7 is a diagram illustrating processing in the present data when there are multiple pieces of print data. FIG. 7 illustrates an example in which the first print data and the second print data are continuously printed. In FIG. 7, the ranges "A" to "F" and the ranges "1" to "8" are again as described in conjunction with FIG. 5. In FIG. 7, it is assumed that there are an image 200 in the first print data and an image 201 in the second print data.

In this example, in the first print data, the region from the front portion to the rear portion in the ranges of "A" and "B" is a print target. That is, in the first print data, the heater element 53-1 that heats the range "A" and the heater element 53-2 that heats the range "B" are the target heater elements. In the second print data, the region from the front portion to the rear portion in the ranges of "E" and "F" is a print target. That is, in the second print data, the heater element 53-5 that heats the range "E" and the heater element 53-6 that heats the range "F" are target heater elements. The image processing unit 74 generates energization data for each of the first print data and the second print data based on the above results.

FIG. 8 is a diagram illustrating an example of energization data of each print data item depicted in the example of FIG. 7. FIG. 8, portion (A) represents the energization data generated based on the first print data, and FIG. 8, portion (B) represents energization data generated based on the second print data. In the example illustrated in FIG. 8, portion (B), energization data when the image corresponding to the second print data is rotated by 0° (that is, not rotated) is illustrated. The energization data illustrated in FIG. 8, portion (A) includes a value "1" in columns for "A" and "B" for the front portion and the rear portion rows, and a value "0" in columns for "C" to "F" for the front portion and the rear portion rows. The energization data illustrated in FIG. 8, portion (B) includes a value "1" in column for "E" and "F" for the front portion and the rear portion rows, and a value "0" in columns for "A" to "D" for the front portion and the rear portion rows.

However, the energization data if the second print data is rotated by 180° corresponds to FIG. 9. FIG. 9 is thus a diagram illustrating an example of the energization data for each print data item depicted in the example of FIG. 7. The energization data illustrated in FIG. 9 includes a value "1" in columns for "A" and "B" in the front portion and the rear portion rows, and a value "0" in columns for "C" to "F" in the front portion and the rear portion rows. That is, after rotation of the data depicted in FIG. 8, portion (B), the result corresponds to FIG. 9.

Figure 10:
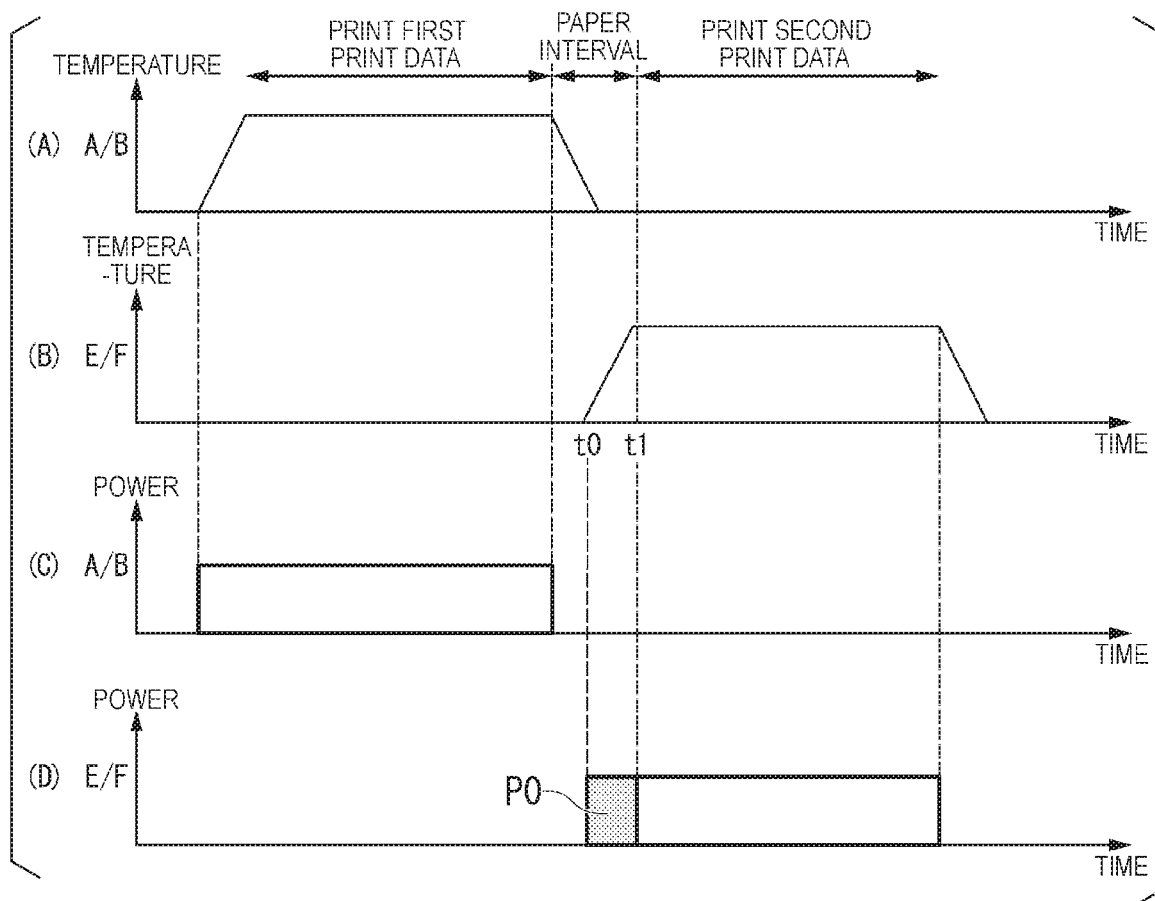
FIG. 10 is a timing chart illustrating temporal transitions of temperature of a fixing device and supplied power when an image corresponding to second print data is rotated by 0°.

FIG. 10 is a diagram illustrating temporal transitions of the temperature of the fixing device 50 and the supplied power when the second print data is not rotated (corresponding to rotation by 0°). FIG. 10, portion (A) is a diagram illustrating a temporal transition of temperature when power is supplied to the heater elements 53-1 and 53-2 that heat the ranges of "A" and "B" in the fixing device 50. FIG. 10, portion (B) is a diagram illustrating a temporal transition of temperature when power is supplied to the heater elements 53-5 and 53-6 that heat the ranges of "E" and "F" in the fixing device 50. FIG. 10, portion (C) is a diagram illustrating a temporal transition of power when power is supplied to the heater elements 53-1 and 53-2 that heat the ranges of "A" and "B" in the fixing device 50. FIG. 10, portion (D) is a diagram illustrating a temporal transition of power when power is supplied to the heater elements 53-5 and 53-6 that heat the ranges of "E" and "F" in the fixing device 50.

In the example illustrated in FIG. 10, portion (A), when the first print data is printed, power is supplied to the heater elements 53-1 and 53-2 that heat the ranges of "A" and "B". When the second print data is printed, power is supplied to the heater elements 53-5 and 53-6 that heat the ranges of "E" and "F". When switching between printing the first print data and the second print data, energization is started at time t0 for the heater elements 53-5 and 53-6. As a result, power for a region P0 is expended until time t1 when the sheet for the second print job (second print data) finally reaches the fixing device 50.

Figure 11:
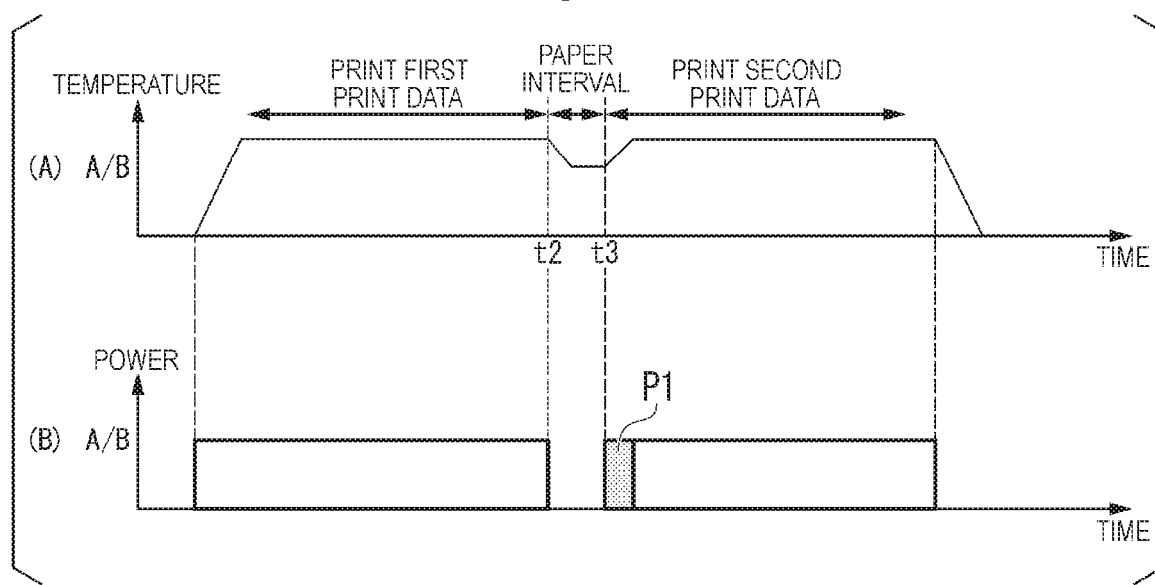
FIG. 11 is a diagram illustrating a temporal transition of the temperature of the fixing device and the supplied power when an image corresponding to second print data is rotated by 180°.

FIG. 11 is a diagram illustrating a temporal transition of the temperature of the fixing device 50 and the supplied power when the second print data is rotated by 180°. FIG. 11, portion (A) is a diagram illustrating a temporal transition of temperature when power is supplied to the heater elements 53-1 and 53-2 that heat the ranges of "A" and "B" in the fixing device 50. FIG. 11, portion (B) is a diagram illustrating a temporal transition of power when power is supplied to the heater elements 53-1 and 53-2 that heat the ranges of "A" and "B" in the fixing device 50.

In the example illustrated in FIG. 11A, when the first print data and the second print data are printed, power is supplied to the heater elements 53-1 and 53-2 to heat the ranges of "A" and "B". When switching between printing the first print data and the second print data, there is residual heat left over from printing the first print data. Therefore, when energization of the heater elements 53-1 and 53-2 is started at time t2, power for a region P1 is expended until time t3 when the sheet reaches the fixing device 50. Therefore, when FIGS. 10 and 11 are compared to each other, the power consumption for printing the two different jobs back to back is different, and more particularly region P1<region P0.

As described above, in a situation such as depicted in FIG. 7, the power consumption is less when the arrangement of the second code data is rotated by 180°. When print data is continuously printed, it is considered that the power consumption is reduced when the energization state of the rear portion of the first print data and the energization state of the front portion of the second print data are made to match.

Based on the above, the image processing unit 74 determines whether or not to rotate the image corresponding to the second code data based on the energization data of each continuous print data item. Specifically, first, the image processing unit 74 performs a logical operation on the energization data of the rear portion of the first print data and the energization data of the front portion when the image corresponding to the second print data is rotated by 0° (i.e., not rotated). The image processing unit 74 performs a logical operation (for example, AND) on the energization data of the rear portion of the first print data and the energization data of the front portion when the image corresponding to the second print data is rotated by 180°.

FIG. 12 is a diagram illustrating the result of a logical operation ("&") when the image corresponding to the second print data is rotated by 0°. It is assumed that the energization data of the rear portion in the first print data and the energization data of the front portion when the image corresponding to the second print data is rotated by 0° are in the state of FIG. 12. At this time, the image processing unit 74 performs a logical operation on the energization data between the heater elements 53 that heat the same range. For example, the image processing unit 74 performs an AND operation on the energization data between the heater elements 53 that heat the same range. As a result, when the image corresponding to the second print data is rotated by 0°, the result of the logical operation of each heater element 53 that heats the ranges of "A" to "F" becomes 0.

When the result of the AND operation is "1", it means that there are corresponding images at the rear portion of the first print data and at the front portion of the second print data. Therefore, when the result of the AND operation is "1", it can be more efficient to continuously energize from the printing of the rear portion of the first print data to the printing of the front portion of the second print data. On the other hand, when the result of the AND operation is "0", it means that images are not continuous from the rear portion of the first print data to the front portion of the second print data. Therefore, when the result of the AND operation is "0", it can be more efficient not to continuously energize between the printing of the rear portion of the first print data to the printing of the front portion of the second print data.

FIG. 13 is a diagram illustrating a result of a logical operation when the image corresponding to the second print data is rotated by 180°. It is assumed that the data of the rear portion included in the energization data of the first print data and the data of the front portion included in the energization data of the second print data are the data in FIG. 13. At this time, the image processing unit 74 performs a logical operation (for example, AND) on the energization data between the heater elements that heat the same range. As a result, when the image corresponding to the second print data is rotated by 180°, the result of the logical operation on the energization data for "A" and "B" becomes 1. When the image corresponding to the second print data is rotated by 180°, the result of the logical operation on the energization for "C" to "F" becomes 0.

Based on the results of FIGS. 12 and 13, it can be seen that the total number of "1" entries is larger after the logical operation if the image corresponding to the second print data is rotated by 180°. A large number of "1" entries after the logical operation means that the images in the different print jobs are continuous. In the examples illustrated in FIGS. 12 and 13, the power consumption can be reduced when the image corresponding to the second print data is rotated by 180° as compared to when the image corresponding to the second print data is rotated by 0°. For this reason, the image processing unit 74 determines that the image corresponding to the second print data is to be rotated by 180°. Hereinafter, it is assumed that a rotation condition is satisfied if the power consumption can be reduced by rotating the second print data by 180°.

Figure 14:
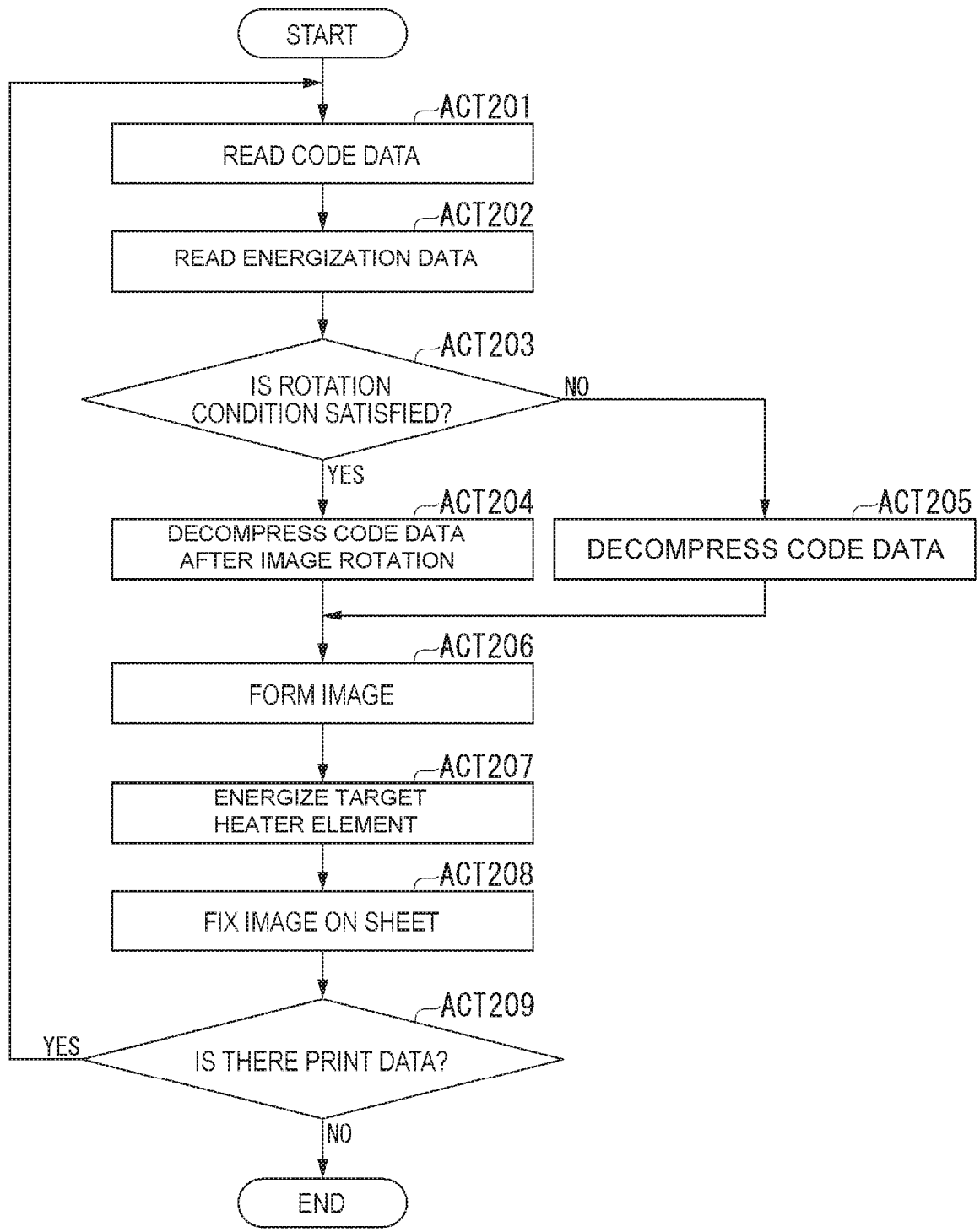
FIG. 14 is a flowchart illustrating a flow of processing when printing print data.

FIG. 14 is a flowchart illustrating a flow of processing when the image forming apparatus 1 according to the embodiment prints print data. The processing of FIG. 14 is executed after a print execution instruction is given.

The image processing unit 74 reads the code data stored in the auxiliary storage device 120 (ACT 201). The image processing unit 74 reads the energization data stored in the auxiliary storage device 120 (ACT 202). The image processing unit 74 determines whether or not the rotation condition is satisfied based on the energization data (ACT 203). If the rotation condition is satisfied (ACT 203: YES), the image processing unit 74 decompresses the second code data while rotating the second code data (ACT 204).

On the other hand, if the rotation condition is not satisfied (ACT 203: NO), the image processing unit 74 decompresses the second code data (ACT 205). That is, if the rotation condition is not satisfied, the image processing unit 74 determines not to rotate the image corresponding to the second code data. After the processing of ACT 204 or ACT 205, the image forming unit 30 forms an image on the sheet based on the decompressed print data (ACT 206). The fixing control circuit 51 energizes the target heater element (s) based on the decompressed print data (ACT 207). Then, the sheet is heated by the target heater element (s) of the heating unit 52, whereby the image is fixed on the sheet (ACT 208). Thereafter, the image processing unit 74 determines whether or not there is other print data (ACT 209). If there is other print data (ACT 209: YES), the image processing unit 74 reads the other print data and again executes the processing after ACT 201.

On the other hand, if there is no other print data (ACT 209: NO), the image processing unit 74 ends the processing of FIG. 14.

With the image forming apparatus 1 configured as described above, the time required for printing can be reduced. Specifically, the image forming apparatus 1 generates energization data of the rear portion in the first print data and energization data of the front portion in the second print data before compressing the print data. The image forming apparatus 1 determines whether or not it is necessary to rotate the image corresponding to the second print data by using each generated energization data item. Then, the image forming apparatus 1 controls the rotation of the second print data according to the determination result. As a result, when the rotation of the second print data is necessary, the image forming apparatus 1 decompresses the second code data while rotating the second code data. On the other hand, when the rotation of the second print data is not necessary, the image forming apparatus 1 decompresses the second code data without rotating the second code data. Therefore, it is not necessary to determine whether or not rotation is necessary after all the print data is decompressed at the time of printing. For this reason, it is possible to reduce the time required for printing.

When printing a plurality of pieces of print data continuously, the image forming apparatus 1 performs a logical operation on the energization data of the rear portion in the first print data and the energization data of the front portion in the second print data. At this time, the image forming apparatus 1 uses the energization data of the front portion when the image corresponding to the second print data is rotated and the energization data of the front portion when the image corresponding to the second print data is not rotated. Specifically, first, the image forming apparatus 1 performs a logical operation on the energization data of the rear portion in the first print data and the energization data of the front portion when the image corresponding to the second print data is not rotated. Further, the image forming apparatus 1 performs a logical operation on the energization data of the rear portion in the first print data and the energization data of the front portion when the image corresponding to the second print data is rotated. Then, the image forming apparatus 1 determines whether or not rotation is necessary based on the result of the logical operation (for example, AND operation) on each energization data item. For example, the image forming apparatus 1 determines whether or not rotation is necessary based on the number of logical operation results of each energization data item indicating 1. A large number of 1 as a result of the logical operation means that the images are continuous. Therefore, the image forming apparatus 1 determines whether or not rotation is necessary because the power consumption can be reduced if the number of logical operation results of each energization data item indicating 1 is larger. Then, the image forming apparatus 1 determines the rotation of the second print data based on the determination result. Therefore, power consumption can be reduced.

Hereinafter, a modification example of the image forming apparatus 1 will be described.

The image processing unit 74 may generate energization data of the rear portion in the sub-scanning direction of the first print data and energization data of the front portion in the sub-scanning direction of the second print data. That is, the image processing unit 74 may not generate the energization data of the front portion in the sub-scanning direction of the first print data. Further, the image processing unit 74 may not generate the energization data of the rear portion in the sub-scanning direction of the second print data.

As described above, if there is energization data of the rear portion in the first print data and energization data of the front portion in the second print data, the necessity of rotation of the second print data can be determined. With this configuration, the amount of calculation performed by the image processing unit 74 can be reduced.

When continuously printing print jobs, the image forming apparatus 1 may in some instances change the printing order of the jobs in consideration of energization data of each print data item. Here, three pieces of print data (first print data, second print data, and third print data) will be described as an example. Specifically, the image processing unit 74 generates energization data of the front portion and the rear portion in each print data item in conjunction with the generation of the code data of each print data item. The image processing unit 74 performs a logical operation on each combination pattern of the energization data of each print data item when a print execution instruction is given. At this time, the image processing unit 74 also uses energization data when the image corresponding to the print data is rotated. The image processing unit 74 determines the combination having a larger number of logical operation results indicating "1" as the printing order of print data. For example, it is assumed that the printing order of the first print data, the third print data, and the second print data is a combination providing a large number of logical operation results indicating "1". In this case, the image processing unit 74 selects this combination as the printing order. The image processing unit 74 causes the printing to be executed in the selected order.

With this configuration, the image processing unit 74 can efficiently execute printing by changing the printing order of print jobs or the like. Specifically, the image processing unit 74 changes the printing order so that the switching of energization to the heater elements 53 is reduced or minimized. Then, the image processing unit 74 changes the printing order so that printing is performed in the selected order. Therefore, power consumption can be reduced.

With the image forming apparatus 1 according to at least one embodiment described above, the heating unit 52 and the image processing unit 74 are provided. The heating unit 52 includes heater elements 53-1 to 53-N. The image processing unit 74 generates first energization data related to the first print data and second energization data related to the second print data before compressing the first print data and the second print data. The image processing unit 74 determines whether or not to rotate the second print data for printing based on the generated first energization data and second energization data. Then, the image processing unit 74 controls the rotation of the second print data according to the determination result to execute the printing. Thus, it is not necessary to determine whether or not rotation is necessary after all print data is decompressed at the time of printing. For this reason, it is possible to reduce the time required for printing.

Some functions of the image forming apparatus 1 in the above-described embodiment may be realized by a general-purpose computer. In that case, a program for realizing these functions is recorded on a non-transitory computer-readable recording medium. The described functions may be realized by causing a computer or a computer system to read and execute the program recorded on a recording medium. The "computer system" referred to here includes an operating system and hardware such as peripheral equipment/devices. In addition, "computer-readable recording medium" refers to a portable medium, a storage device, or the like. The portable medium can be a flexible disk, a magneto-optical disk, a ROM, a CD-ROM, or the like. In addition, the storage device can be a hard disk built in the computer system or the like. Furthermore, the "computer-readable recording medium" can be cloud-based and/or downloadable (or otherwise accessible) via a network connection such as a communication line or cable. The communication line can be a network such as the Internet, a telephone line, or the like. The "computer-readable recording medium" may be a network server or a client terminal, whether virtualized or tangible, accessible across a network or otherwise. Further, the above-described program may be realize various functions in conjunction with another program, an operating system, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   an image forming device configured to form images on sheets;
   a heater including a plurality of heater elements arranged in a first direction and configured to fix images to the sheets from the image forming device; and
   a control circuit configured to:
      divide an image region of first raster image data representing a first image to be formed by the image forming device into a plurality of first sub-regions;
      perform a first noise reduction on the first image by determining, with respect to each of the first sub-regions, whether or not a number of color pixels is greater than a threshold;
      generate first energization data indicating energization states of each of the heater elements based on a result of the first noise reduction, compress the first raster image data into first compressed image data, and store the generated first energization data and the first compressed image data in a storage;
      divide an image region of second raster image data representing a second image to be formed by the image forming device after the first image into a plurality of second sub-regions;
      perform a second noise reduction on the second image by determining, with respect to each of the second sub-regions, whether or not a number of color pixels is greater than the threshold;
      generate second energization data indicating energization states of each of the heater elements based on a result of the second noise reduction, compress the second raster image data into second compressed image data, and store the generated second energization data and the second compressed image data in the storage; and
      determine whether rotation of the second image by a predetermined degree will lower power consumption based on a comparison of the first energization data to the second energization data.

2. The image forming apparatus according to claim 1, wherein the control circuit is further configured to:
   convert the second compressed image data to third compressed image data representing a third image obtained by rotating the second image by the predetermined degree; and
   decompress the third compressed image data into third raster image data.

3. The image forming apparatus according to claim 2, wherein the control circuit is further configured to:
   decompress the second compressed image data into the second raster image data; and
   control the image forming device to form the second image based on the second raster image data.

4. The image forming apparatus according to claim 1, wherein the control circuit is configured to:
   generate the first energization data based on a portion of the first raster image data representing a part of the first image including a trailing end in a sub-scanning direction; and generate the second energization data based on a portion of the second raster image data representing a part of the second image including a leading end in the sub-scanning direction.

5. The image forming apparatus according to claim 1, wherein the predetermined degree is 180°.

6. The image forming apparatus according to claim 1, wherein
each binary bit of the first energization data indicates an energization state for a corresponding one of the heater elements,
each binary bit of the second energization data indicates an energization state for a corresponding one of the heater elements, and
the control circuit performs a logical operation on the first energization data and the second energization data to determine whether rotation of the second image by the predetermined degree will lower power consumption.

7. The image forming apparatus according to claim 6, wherein the logical operation is an AND operation.

8. The image forming apparatus according to claim 1, wherein the image forming device form images on sheets with a toner.

9. An image forming method, comprising:
dividing an image region of first raster image data representing a first image to be formed by an image forming device into a plurality of first sub-regions;
performing a first noise reduction on the first image by determining, with respect to each of the first sub-regions, whether or not a number of color pixels is greater than a threshold;
generating first energization data indicating required energization states of each of a plurality of heater elements in a fixing device based on a result of the first noise reduction, compressing the first raster image data into first compressed image data, and storing the generated first energization data and the first compressed image data in a storage;
dividing an image region of second raster image data representing a second image to be formed by the image forming device after the first image into a plurality of second sub-regions;
performing a second noise reduction on the second image by determining, with respect to each of the second sub-regions, whether or not a number of color pixels is greater than the threshold;
generating second energization data indicating required energization states of each of the plurality of heater elements based on a result of the second noise reduction, compressing the second raster image data into second compressed image data, and storing the generated second energization data and the second compressed image data in the storage; and
determining whether rotation of the second image by a predetermined degree will lower power consumption based on a comparison of the first energization data to the second energization data.

10. The image forming method according to claim 9, wherein the predetermined degree is 180°.

11. The image forming method according to claim 9, further comprising:
generating third image data using the second compressed image data when it is determined that rotation of the second image by the predetermined degree will lower power consumption; and
forming a third image, instead of the second image, on a sheet with the image forming device when it is determined that rotation of the second image by the predetermined degree will lower power consumption based, third image being formed based on the third image data.

12. The image forming method according to claim 11, wherein the predetermined degree is 180°.

13. The image forming method according to claim 9, wherein the image forming device forms images on sheets with a toner.

14. The image forming method according to claim 9, wherein the image forming device forms images on sheets with a plurality of toners.

* * * * *

UNITED STATES PATENT AND TRADEMARK OFFICE
CERTIFICATE OF CORRECTION

PATENT NO. : 11,119,428 B2
APPLICATION NO. : 16/793787
DATED : September 14, 2021
INVENTOR(S) : Tsutomu Ueta It is certified that error appears in the above-identified patent and that said Letters Patent is hereby corrected as shown below:

In the Claims

In Column 15, Claim 8, Line 23, please replace "form" with --forms--.

In Column 16, Claim 11, Line 30, please delete "based".

Signed and Sealed this
Twenty-fifth Day of October, 2022

Katherine Kelly Vidal
*Director of the United States Patent and Trademark Office*